Figure 1:
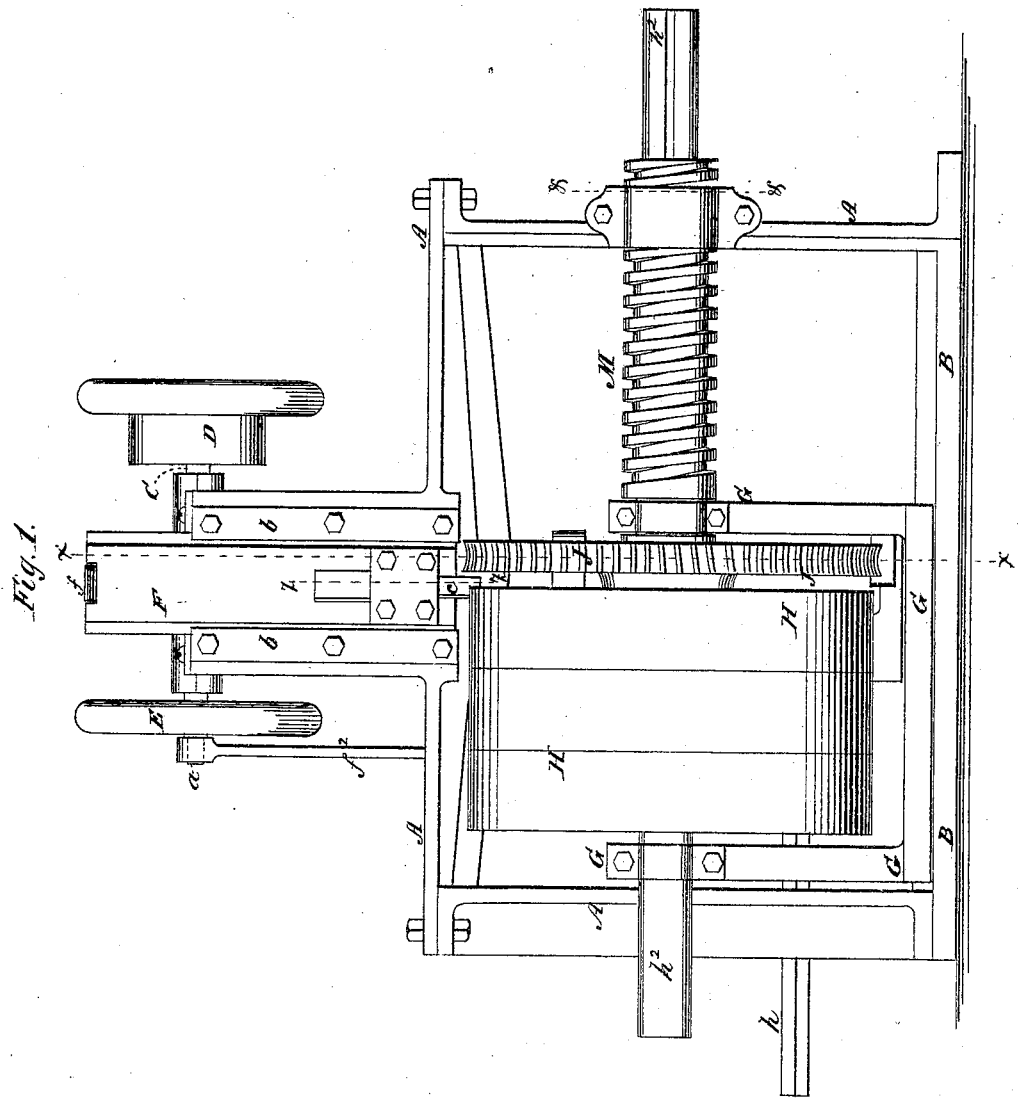

5 Sheets--Sheet 1.

S. B. DEAN, W. T. NICHOLSON, & G. AMES.

Improvement in Machines for Cutting Teeth on Cylinders.

No. 130,361. Patented Aug. 13, 1872.

Witnesses:
E. Wolff
J. Felbel

Inventor.
G. Ames, S. B. Dean,
and W. T. Nicholson
By Attorney
J. N. McIntire

5 Sheets--Sheet 2.

S. B. DEAN, W. T. NICHOLSON & G. AMES.

Improvement in Machines for Cutting Teeth on Cylinders.

No. 130,361. Patented Aug. 13, 1872.

Witnesses:
E. Wolff.
J. Felbel.

Inventor:
G. Ames, S. B. Dean,
and W. T. Nicholson.
By attorney
J. N. McIntire.

5 Sheets--Sheet 3.
S. B. DEAN, W. T. NICHOLSON, & G. AMES.
Improvement in Machines for Cutting Teeth on Cylinders.
No. 130,361. Patented Aug. 13, 1872.
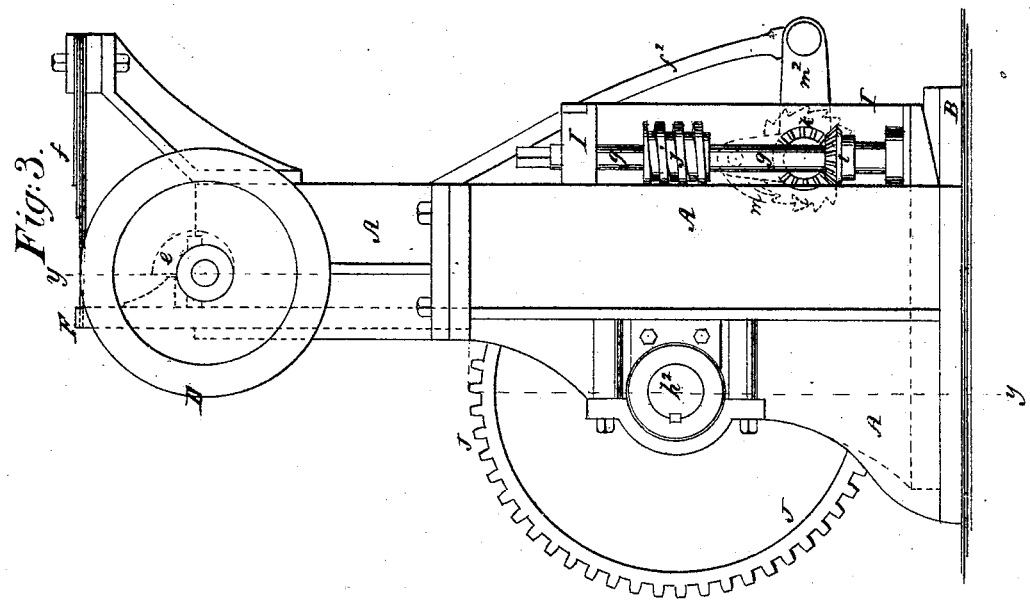

5 Sheets--Sheet 4.
S. B. DEAN, W. T. NICHOLSON, & G. AMES.
Improvement in Machines for Cutting Teeth on Cylinders.
No. 130,361.  Patented Aug. 13, 1872.
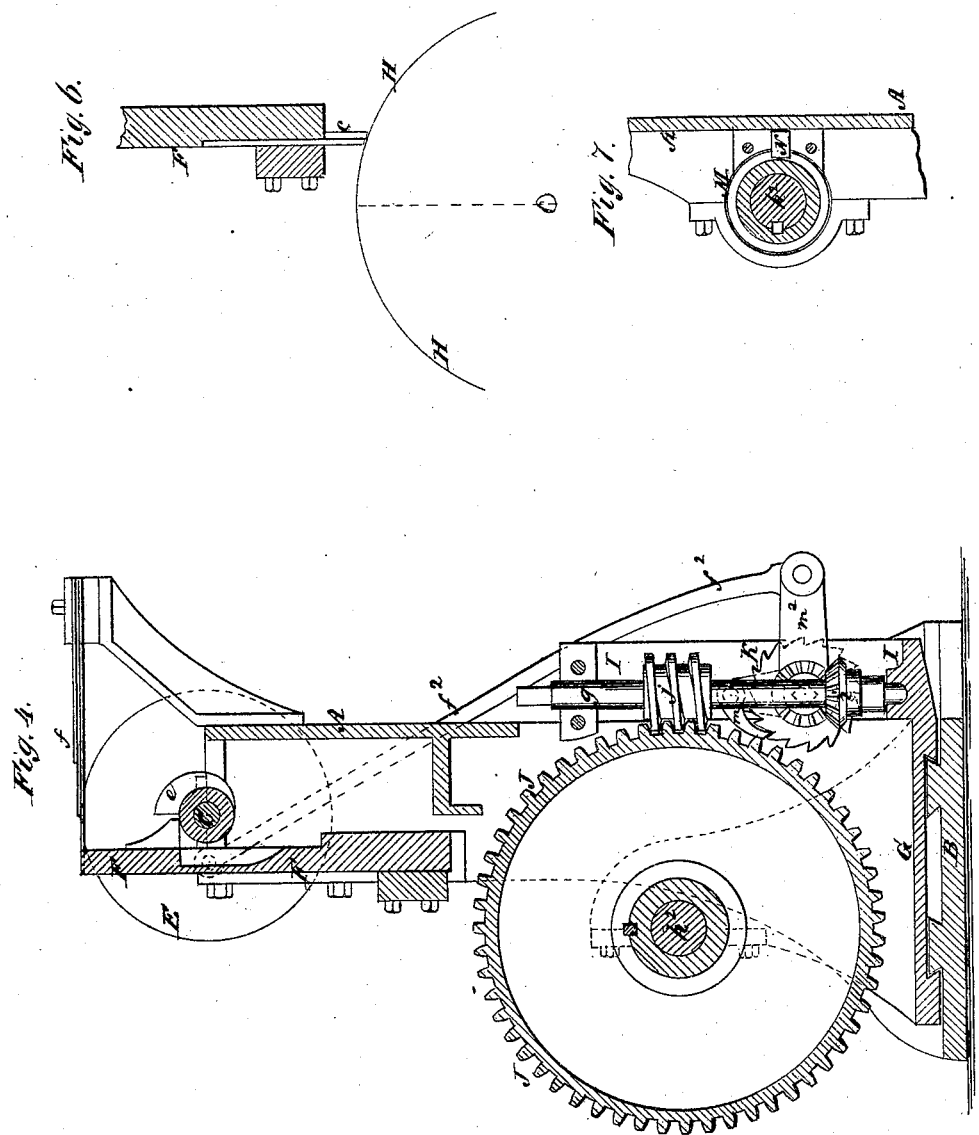
Witnesses:
E. Wolff
J. Fidbel
Inventor:
G. Ames, S. B. Dean,
and W. T. Nicholson.
By attorney
J. N. McIntire

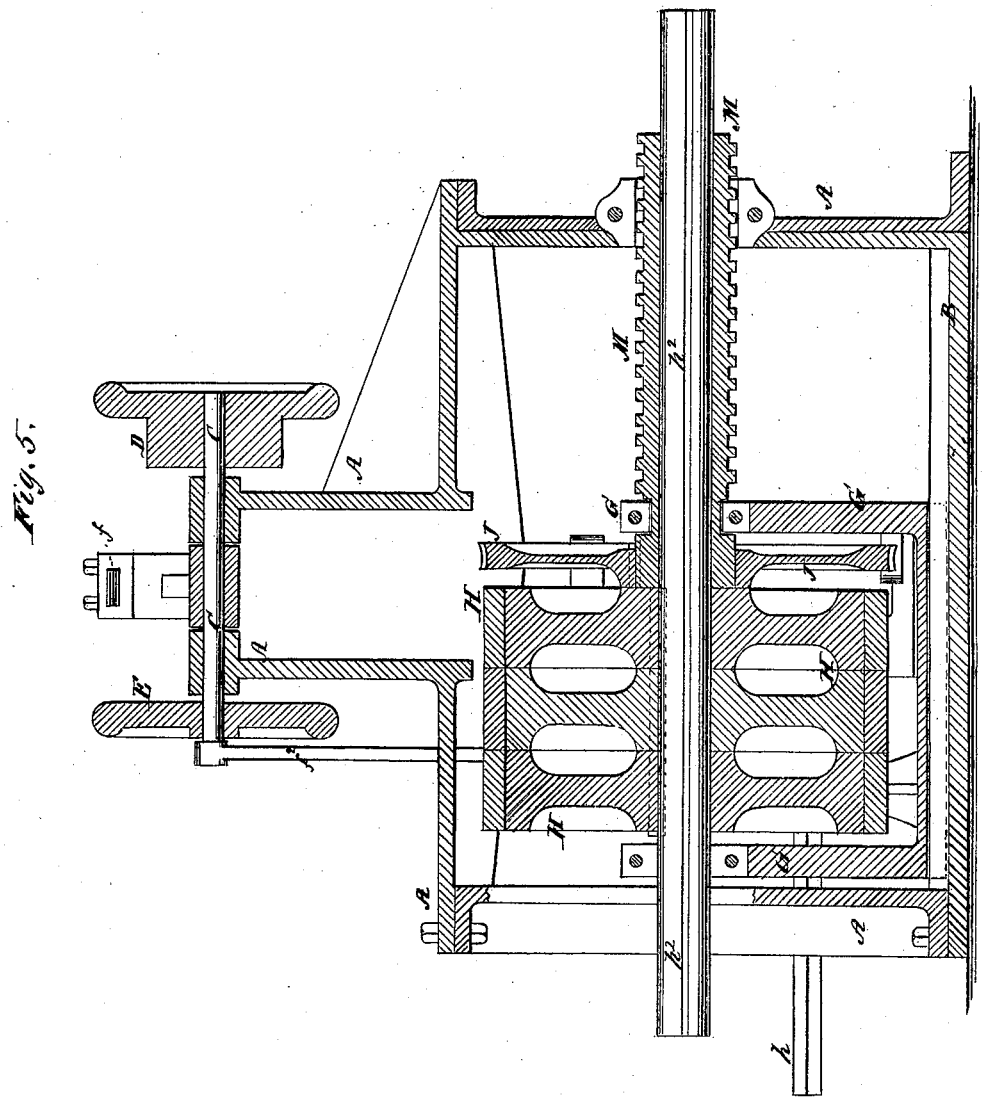

UNITED STATES PATENT OFFICE.

SAMUEL B. DEAN, OF BOSTON, MASSACHUSETTS, WILLIAM T. NICHOLSON, OF PROVIDENCE, RHODE ISLAND, AND GUSTAVUS AMES, OF OSWEGO, NEW YORK; SAID DEAN & NICHOLSON ASSIGNORS TO SAID GUSTAVUS AMES.

IMPROVEMENT IN MACHINES FOR CUTTING TEETH ON CYLINDERS.

Specification forming part of Letters Patent No. 130,361, dated August 13, 1872.

SPECIFICATION.

*To all whom it may concern:*

Be it known that we, SAMUEL B. DEAN, of Boston, in the county of Suffolk and State of Massachusetts, WILLIAM T. NICHOLSON, of Providence, in the county of Providence and State of Rhode Island, and GUSTAVUS AMES, of Oswego, in the county of Oswego and the State of New York, have invented a new and useful Machine for Cutting Teeth or File-Like Serrations upon Cylindrical Surfaces; and we do hereby declare that the following is a full and exact description thereof, reference being had to the accompanying drawing making part of this application.

Our invention relates more particularly to the cutting of the teeth or file-like serrations which have to be employed upon the peripheries or cylindrical faces of the large metallic grinding or cutting cylinders which are used in machinery for reducing wood to a fibrous condition to make paper-stock, but may be used with advantage in other applications in the mechanic arts.

Prior to our invention in the construction or manufacture of any and all sorts of metal-faced cylinders, the peripheries or external faces of which it has been necessary to have serrated or cut file-like to produce a cutting and grinding surface, it has been customary to cut the serrations or form the numerous cuts upon the cylindrical metallic face with a chisel and hand labor. This heretofore-practiced method of making such cutters or grinders has answered very well where the cutters have been applied to the customary uses; but we have found that in the application of such cutting or grinding cylinders to machinery for reducing wood to a condition to make paper-stock, the cutting and recutting of their surfaces in the known manner has engendered a cost or expense so great as to more than neutralize the practical advantages gained by the use, in the grinding or reduction of wood to a fibrous pulp, of these metallic grinders or cutters; and the problem has therefore been presented of devising some means for so economically producing the serrated or file-like surfaces upon the metallic faces of cylinders that the advantages to be gained by the use of machinery for grinding wood of these metallic cutters or grinders may be enjoyed. To gain a practical solution of this problem and devise a means by which the metallic faces of cylindrical cutters, grinders, &c., may be properly cut or serrated, after the fashion of a file-surface, at comparatively small cost, is the object of our invention. And to this end and object our invention consists in an organized machine provided with a suitable serrating or file-cutting mechanism and means for holding, rotating, and feeding the cylindrical cutter, disk, or grinder, (or other round-faced device to be operated upon,) while subjected to the action of the cutting mechanism, as will be hereinafter more fully described. And our invention further consists in so constructing such a machine that the cutting-tool shall move always in a direction at an angle to a radius terminating at that point in the periphery of the cylinder at which the tool is cutting, whereby we are enabled to make a plain chisel produce the desired cut, as will be hereinafter more fully explained. And our invention further consists in the use, in connection with a cutting or serrating mechanism, and a means for mounting and holding the cylinder to be cut, of devices for automatically feeding the work both in a rotary and in a lateral direction, whereby we are enabled to automatically perform the entire cutting operation upon the cylindrical face of the wheel or disk being operated upon.

To enable those skilled in the art to make and use our invention we will proceed to more fully describe the same, referring by letters to the accompanying drawing, in which—

Figure 2:
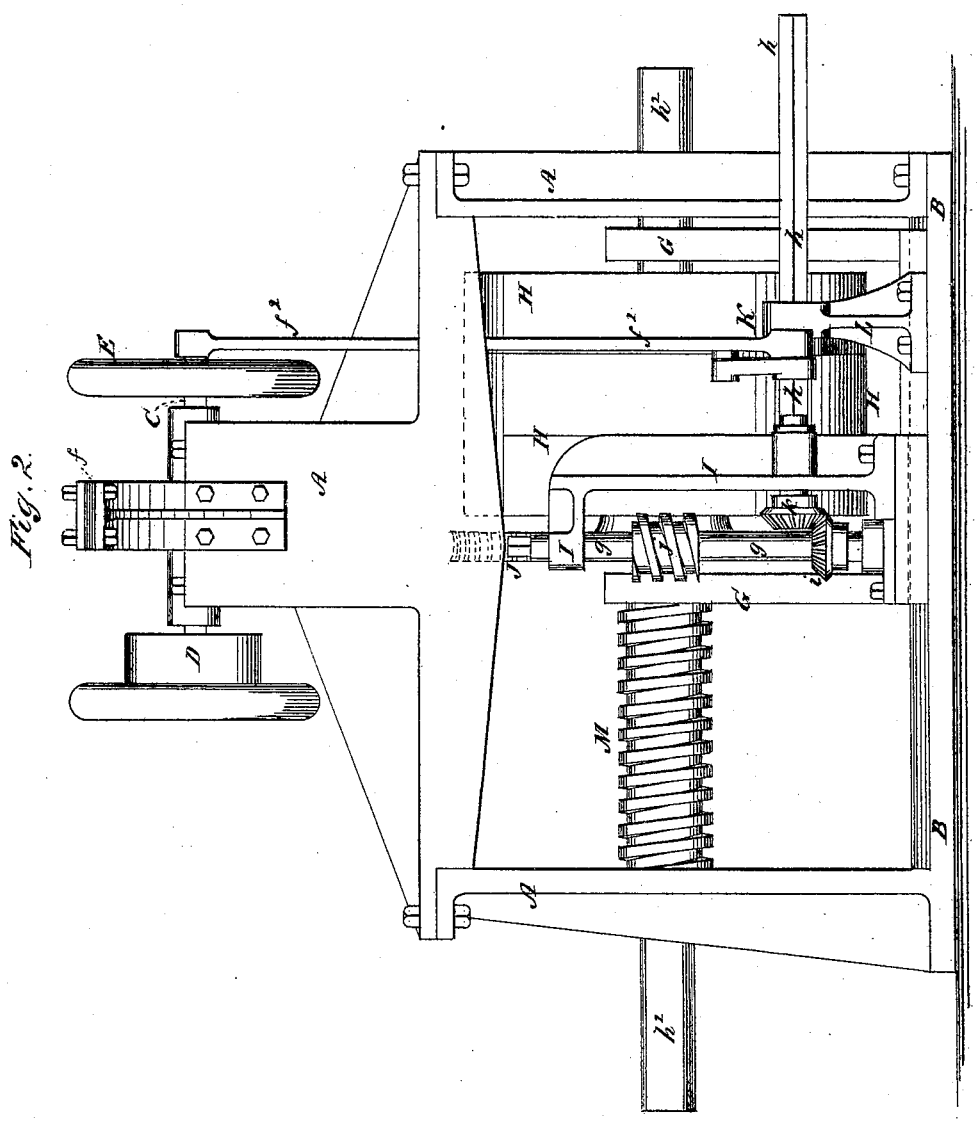

Figure 1 is a front view or elevation; Fig. 2, a back view; Fig. 3, an end elevation; Fig. 4, a vertical cross-section at *x x*; Fig. 5, a vertical longitudinal section at *y y*; Fig. 6, a detail vertical section at *z z*; and Fig. 7, a detail vertical section at & &.

In the several figures the same part is designated by the same letters of reference.

A represents a suitable frame, provided with a proper base or supporting-bed, B, and upon which are mounted all the working parts of the machine. On the upper part of the main frame A of the machine is mounted in suitable bearings the main driving-shaft C, upon one end of which is secured the driving-pulley D, and on the other end of which is a face-plate, E, provided with a crank or wrist-pin, $a$, to which is pivoted one end of a pitman that drives a pawl-and-ratchet mechanism, as and for purposes to be presently explained. Immediately in front of the main shaft C is arranged, to work freely in suitable ways or guides $b\ b$, a vertically reciprocatory carriage, F, at the lower end of which is provided a suitable tool-stock, in which the chisel $c$ is adjusted and secured in a manner well known. The slide or carriage F is intermittingly lifted during the rotation of the cam-shaft C. At $f$ is a depressing-spring, which is made fast at one end to the frame of the machine, and rests, with a constant pressure at the other end, on the top of carriage F. By means of this spring the carriage and its contained chisel are thrown downward with the proper force after having been lifted by and released from the lifting cam or toe $e$. Upon the bed-plate B of the machine are arranged suitable ways, upon which rests and travels a carriage, G, that carries the work and certain working parts of the machine, as will be explained. This carriage is made and mounted on its ways somewhat after the fashion of the carriage which carries the dead-spindle of an ordinary engine-lathe. It is provided with suitable bearing-boxes, in which is mounted the arbor or spindle of the cylinder H, (to be operated upon.) At its rear side is bolted on, or otherwise attached or provided, an auxiliary vertical stand, I, in which are mounted, as illustrated, a vertical shaft, $g$, and a horizontal shaft, $h$, the former of which, $g$, has keyed upon it a bevel-gear, $i$, and a worm, $j$, while the latter is provided only with a bevel-pinion, $k$. The bevel-gears $i$ and $k$ mesh together, and the worm $j$ engages with a worm-wheel or gear, J, as and for the purposes to be presently explained. The horizontal shaft $h$ is made square (or may be provided with a suitable spline) during the greater part of its length, so that it can slide or traverse endwise through the hub of a ratchet mechanism at K, while it is subject to be rotated by the latter. This rotating mechanism consists of an ordinary ratchet-wheel, $l$, having a pawl, $m$, arranged to vibrate or oscillate about its center, and the whole mounted in a suitable stand, L, bolted to the rear side of the bed-plate of the machine. The projecting arm $m^2$ of the pawl is connected to the lower end of the pitman $f^2$, before alluded to. M is a screw-feeder, which surrounds the spindle of the cylinder H during part of its length; it takes a bearing in one of the ends of the main frame as shown, and at one end comes against one of the sides of the carriage G. This screw-feeder is splined onto the shaft $h^2$, so that while the latter is free to move longitudinally within said sleeve or feeder said feeder is rotated with said shaft, and as it is so rotated it is forced along endwise, together with the carriage and its contained work, by means of a stationary lug or tooth, which is arranged at N and fits and works in the thread of the screw-feeder M. The worm-gear J is temporarily fastened to the cylinder H, and by its motions effects an intermittent rotation on its axis of said cylinder.

With the foregoing description of the construction and arrangement together of the parts, the following will suffice to make clear the general operation or working of the machine: The cylinder to be cut is mounted on its arbor or spindle in the carriage G in the manner illustrated and described, and the chisel $c$ having been properly adjusted and the cylinder to be cut having been placed so that said chisel will commence to operate at one edge or side of the face of the cylinder, power is applied in the usual manner to the main driving-pulley and the machine set in motion. At each revolution of the main shaft the carriage F will be lifted by the toe or cam and let fall with a velocity and force accelerated by the action of the spring, as before described, and a blow be thus effected of the cutting-chisel $c$ upon the surface of the cylinder H. At each revolution of the main shaft the cylinder, through the action of the gear J and worm $j$, (actuated by the gears $i$ and $k$ and ratchet mechanism K before described,) will be rotated a given minute distance upon its axis, so that a fresh surface will come beneath the chisel $c$ at its next descent, and so a series of cuts are made (or teeth cut) in regular succession and equidistant in the direction of the circumference of the cylinder; and as each partial or fractional rotary movement of the cylinder and its rotating mechanism effects a similar rotation of the screw-feeder M, it results that at each rotary movement of the cylinder beneath the cutting-chisel said cylinder, with its supporting carriage, &c., is fed laterally a given distance, and by the compound rotary and lateral (intermittent) feed-motion the teeth are cut in a helical direction over the entire surface of the cylinder. This chisel is so made and arranged relatively to the face of the cylinder H as to cut in lines oblique to a line drawn across the face of the cylinder and parallel to its axis, and when the cylinder has had its entire face cut over once the obliquity of the cutting-edge of the chisel is reversed by a readjustment of the chisel, and the cylinder is cut over again, the teeth formed this time crossing the lines of those first made, and so the entire surface is cut after the fashion of a cross-cut file and in a helical direction. It will be observed that the arrangement of the chisel and its actuating mechanism over the cylinder to be cut (or over the carriage in which the cylinder is to be mounted) is such that the chisel strikes vertically in a line some distance back of the vertical line which would pass through the axis of the cylinder. The object and effect of this are to cause the cut to be made at an angle to the plane or direction of the face of the cylinder, and to thus throw up the proper burr or tooth like cutting-edge without the necessity of any peculiar and complex form in the chisel itself. By thus placing the chisel so as to strike vertically, but off to one side of the axis of the cylinder, we are enabled to produce, with an ordinary plain chisel-edge, the same sort of cut and thrown-up cutting-edge, in the formation of each tooth on the cylinder, that is given to the teeth of files by means of the peculiarly shaped cutting-tools employed in their manufacture. And it will be understood that this peculiarity of construction and mode of operation in our machine are of considerable advantage. In lieu of the particular means shown for effecting the combined rotary and lateral feed to the cylinder, other devices or appliances may be employed without departing from that part of our invention which relates to the use, in combination with a cutting mechanism and a means for holding the work, of automatic means for effecting the necessary feeds to the work. And when it may be desired to cut the file-like teeth in parallel stripes on the face of the cylinder, some suitable means should be applied in lieu of that shown for feeding the cylinder laterally, which will move the cylinder only once at each complete revolution on its axis, and a distance equal to the width of the ring cut on its face.

Although we deem the arrangement of the cutting mechanism, as made, the subject of part of our invention, desirable, it will be understood that, in carrying out the first part of our invention, this feature, and also that of the automatic feed mechanism, may be omitted without losing the advantages gained by that part of our invention which relates to the idea of combining with a cutting mechanism, for forming the serration on the surface of a cylinder, a means for retaining the cylinder, as described. We therefore wish it to be understood that we do not desire to limit ourselves, in the practicing of our invention, to the embodiment in a machine of all the features herein described and referred to; neither do we wish to be understood as limiting our invention to the particular devices or precise mode of construction of the several parts of the machine; but, Having so fully explained our new machine that one skilled can make and use the invention, what we claim as new, and desire to secure by Letters Patent, is—

1. In combination with the mechanism for cutting the necessary file-like teeth or serrations upon the face of the cylinder or ring, the means for supporting the cylinder in such a manner that it may be fed along or moved both circumferentially and in the direction of its axis, for the purpose specified.

2. The placement or arrangement of the cutting device relatively to the carriage and axis, on which the cylinder is mounted, and moved in such a manner that the chisel will strike the cylinder at an angle to a radius terminating at the point of contact of the chisel with the surface to be cut, in the manner and for the purpose specified.

3. In combination with the cutting mechanism and the cylinder-supporting device, the means for automatically feeding the cylinder in the several directions, as described, and for the purpose set forth.

In testimony whereof we have hereunto set our hands and seals.

SAMUEL B. DEAN. [L. S.]
    WILLIAM T. NICHOLSON. [L. S.]
    GUSTAVUS AMES. [L. S.]

In presence of—

R. L. ROBERTS,
WM. C. MCINTIRE,
As to S. B. DEAN and GUSTAVUS AMES.
JOHN D. THURSTON,
WM. C. MCINTIRE,
As to WM. T. NICHOLSON.